US007735623B2

(12) United States Patent
Gonzalez Alemany et al.

(10) Patent No.: US 7,735,623 B2
(45) Date of Patent: Jun. 15, 2010

(54) LINEARLY ACTUATED ROTATING HANDRAIL SYSTEM FOR ESCALATORS AND MOVING WALKWAYS

(75) Inventors: Miguel Angel Gonzalez Alemany, Oviedo (ES); Juan Domingo Gonzalez Pantiga, Gijon (ES); Manuel Alonso Cuello, Gijon (ES); David Moris Moro, Gijon (ES); Jose Ojeda Arenas, Asturias (ES)

(73) Assignees: Thyssenkrupp Elevator Innovation Center, S.A., Cabuenes (ES); Thyssenkrupp Elevator (ES/PBB), Ltd., Cabuenes (ES)

( * ) Notice: Subject to any disclaimer, the term of this patent is extended or adjusted under 35 U.S.C. 154(b) by 0 days.

(21) Appl. No.: 12/351,829

(22) Filed: Jan. 10, 2009

(65) Prior Publication Data

US 2009/0183968 A1 Jul. 23, 2009

(30) Foreign Application Priority Data

Jan. 18, 2008 (ES) ................................ 200800124

(51) Int. Cl.
*B65G 23/06* (2006.01)

(52) U.S. Cl. ....................................... 198/331; 198/330

(58) Field of Classification Search ................. 198/330, 198/331

See application file for complete search history.

(56) References Cited

U.S. PATENT DOCUMENTS

| | | | | | |
|---|---|---|---|---|---|
| 4,895,240 | A * | 1/1990 | Bruehl et al. | ............... | 198/331 |
| 5,092,446 | A * | 3/1992 | Sullivan et al. | ............. | 198/331 |
| 5,125,494 | A * | 6/1992 | Nurnberg et al. | ............ | 198/331 |
| 5,755,315 | A * | 5/1998 | Wallbaum et al. | ........... | 198/331 |
| 6,199,678 | B1 * | 3/2001 | Reo | ........................... | 198/330 |
| 6,971,497 | B2 * | 12/2005 | Illedits et al. | ............... | 198/330 |

* cited by examiner

*Primary Examiner*—James R Bidwell
(74) *Attorney, Agent, or Firm*—Egbert Law Offices PLLC

(57) ABSTRACT

The present invention is a linearly actuated rotating handrail system for escalators and moving walkways. The system includes a worm band or a handrail, having a first friction device on one side, a dragging device formed by a second friction device and coupled to the first friction device to drag the worm band in the displacement direction. The pressure device includes a first layer of kinematic support, formed by a crank, an articulated shaft, a driving connection rod, shafts and driven cranks. There is a second layer formed by traction rollers. The application of pressure to the worm band or handrail and its balanced distribution over the different pressure rollers is carried out by slides actuated by a distributor, tightened by an elastic system. The elastic system transmits the tension by a beam.

4 Claims, 4 Drawing Sheets

LINEARLY ACTUATED ROTATING HANDRAIL SYSTEM FOR ESCALATORS AND MOVING WALKWAYS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention, as expressed in the heading of this specification, relates to a linearly actuated rotating handrail system for escalators and moving walkways, contributing several advantages and innovative characteristics to the function for which it is destined, which will be described later in detail.

2. Description of Related Art Including Information Disclosed Under 37 CFR 1.97 and 37 CFR 1.98

Conventional passenger transport systems, such as escalators or moving walkways, include a handrail actuation mechanism which normally consists of a chain driven by the main actuation shaft. There are toothed wheels, which move the shaft where two wheels covered with elastic and deformable material are solidly joined. The two wheels move by friction between said elastic and deformable material cover and the inner surface of the flexible band that comprises the handrail.

This handrail needs, in turn, a pressure element or elements to avoid the loss of contact between the flexible band or handrail and the wheel covered by elastic and deformable material. The elements may be rollers, a belt with the consequent mechanism joined to an elastic element, a spring or other elements. This assembly provides the necessary pressure to move the handrail of the escalator or moving walkway by friction.

The wear of the aforementioned rubber-covered handrail actuation wheel influences the speed of the handrail itself on being dependent on the diameter thereof; i.e. the tangential speed of said wheel is the speed of the handrail.

In summary, the actuation of the handrail in a conventional escalator or moving walkway is driven by the shaft. The toothed wheels, being actuated by the step chain or conveyor plates, are solidly joined and in turn actuate, by means of a chain, another shaft whereto wheels that move each of the flexible bands that comprise the handrail are solidly joined.

In order to ensure an optimal contact between the handrail and the handrail actuation wheel, the radius of this actuation wheel must have a considerable size. In such a case, the height of the escalator or moving walkway, and therefore the depth of the pit, is increased.

Other handrail actuation systems are linear. In linear actuation systems, the driving force is transmitted by means of a chain and pressure rollers. The chain transmits the movement directly or indirectly to the handrail while the pressure rollers guarantee an adequate contact between the traction system and the tractioned elements.

However, the applicant is unaware of the existence of any linearly actuated rotating handrail system for escalators and moving walkways that presents technical, structural and configuration characteristics similar to that presented herein. The objective of the present invention is to offer an advantageously improved and alternative system to those previously disclosed which represent the current state of the art.

BRIEF SUMMARY OF THE INVENTION

The object of the present invention is to develop a handrail actuation system for escalators or compact moving walkways, by means of linear traction, which represents, on one hand, considerable savings in space and, on the other, cost savings in the manufacture of intermediate actuation bodies such as wheels covered with elastic and deformable material, toothed wheels, chains and belts. It also offers another advantage that consists of the handrail actuation system maintaining a constant handrail speed independent of the wear of the wheel covered with elastic and deformable material.

Specifically, the invention relates to an actuation system that moves the handrail of a moving walkway or escalator by means of a set of actuation and pressure rollers that come into contact directly with one of the handrail surfaces.

An escalator or moving walkway that incorporates an actuation of these characteristics represents significant savings in manufacturing costs, as it is a modular system that is easily assembled, producing a more compact handrail actuation system.

On the other hand, the absence of chains, gears and other transmission elements improves noise and vibration levels. In the same way, the present invention eliminates the need for preventive maintenance that requires elements such as chains, gears, etc.

Additionally, with these savings in auxiliary actuations, the space required in the head to install an actuation is reduced, due to which the construction of a deep pit wherein to store the end heads of the escalator or moving walkway can be advantageously avoided. The consequent savings result from the non-execution of civil works, consequently enabling an actuation system for moving walkways or modular escalators to be, therefore, portable. This invention, therefore, reduces noise and vibration levels and eliminates the need for preventive maintenance, thereby improving passenger comfort.

As already indicated, the handrail is comprised of a flexible band that runs along the length of the moving walkway or escalator, with outbound and inbound transit lanes and a mechanism that drags said band.

In accordance with the invention, the flexible band moves at a constant speed, appreciably equal to that of the transport plates or steps, throughout the length of the walkway.

Specifically, the invention relates to a linearly actuated rotating handrail system for escalators and moving walkways for passenger transport which comprises: a movement transmission system consisting of cranks, connection rods, pressure elements and other support and transmission elements.

The system comprises dragging means configured to transmit a dragging movement from the actuation means to the flexible band that serves as a handrail.

The dragging assembly comprises: a series of shafts and cranks solidly joined to rollers which, by contact with one of the surfaces of the flexible band or handrail, provide the movement thereof.

The invention also provides elements to avoid the loss of contact between the flexible band or handrail and the rollers that comprise the dragging system which, in a preferred embodiment, forms a lever and beam system which ensures that the same force is exerted throughout the flexible band, which in turn ensures that the traction rollers do not slide.

It is worth noting that, in other embodiments, the aforementioned pressure means applied to the worm band may consist of a belt or rubber block chain applied to the outer surface of the flexible band.

In summary, the invention relates to a handrail actuation system for moving walkways and escalators, through cranks-connection rods and rollers that are directly in contact with the interior of the flexible band that serves as a handrail.

The escalator or moving walkway does not have a handrail actuation wheel. The function of the handrail actuation wheel, covered by elastic elements, is carried out by the crank-roller assembly, in such a way that, with this handrail actuation system, the height of the walkway heads is reduced.

Therefore, the previously described linearly actuated rotating handrail system represents an innovative structure with new structural and constituent characteristics as yet unused for such purpose, reasons which, together with its practical utility, confer sufficient grounds for obtaining the privilege of exclusivity being requested.

BRIEF DESCRIPTION OF THE SEVERAL VIEWS OF THE DRAWINGS

For the purpose of complementing the foregoing description and to further explain the characteristics of the invention, a set of drawings in accordance with a preferred embodiment thereof has been included as an integral part of this specification, in which the following figures have been represented in an illustrative and non-limiting manner.

DETAILED DESCRIPTION OF THE INVENTION

Figure 1:
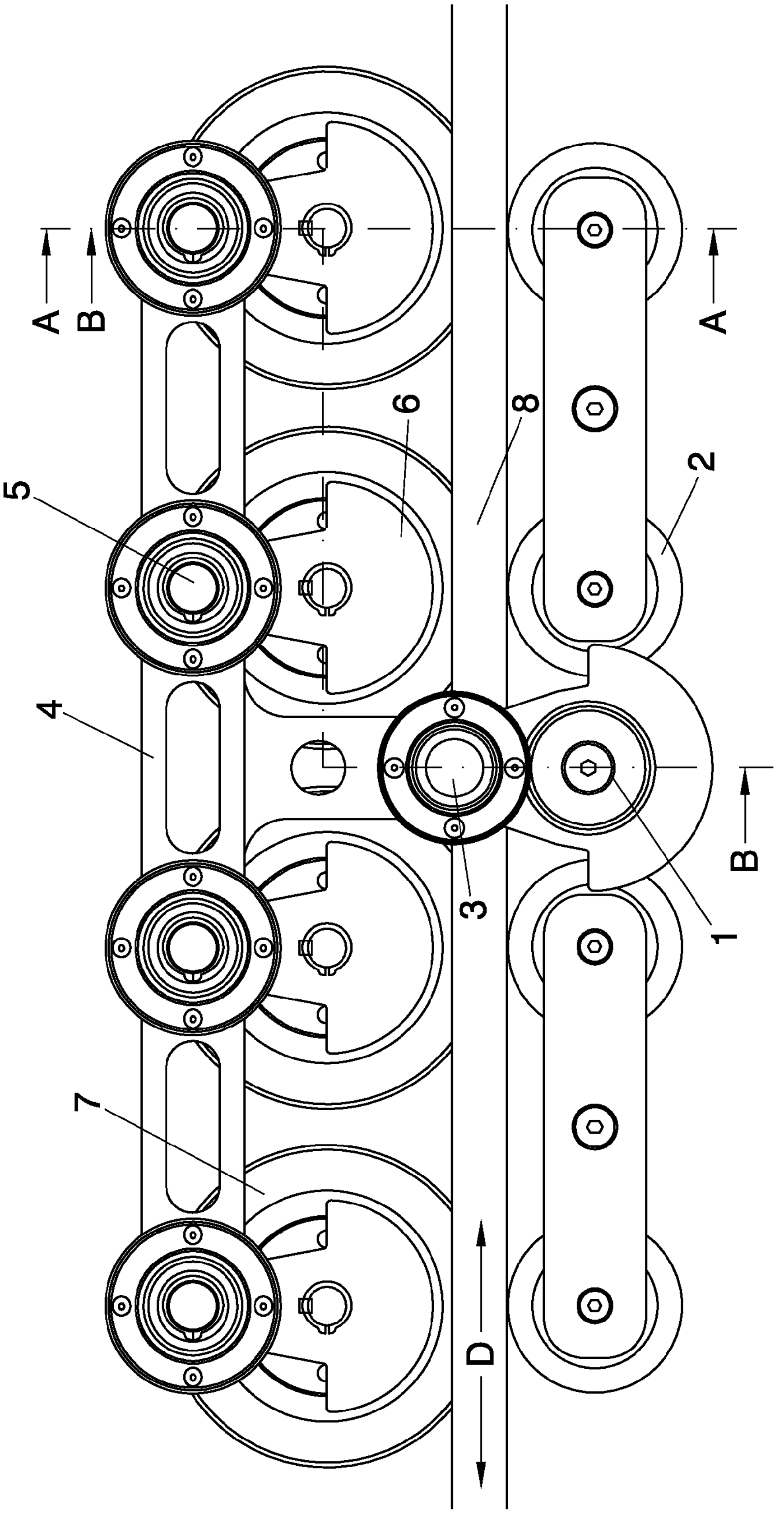
FIG. 1 is a top plan view of an example of embodiment of the linearly actuated rotating handrail system for escalators and moving walkways which is the object of the invention, where its main constituent parts and elements can be observed, except for the pressure system.
Figure 2:
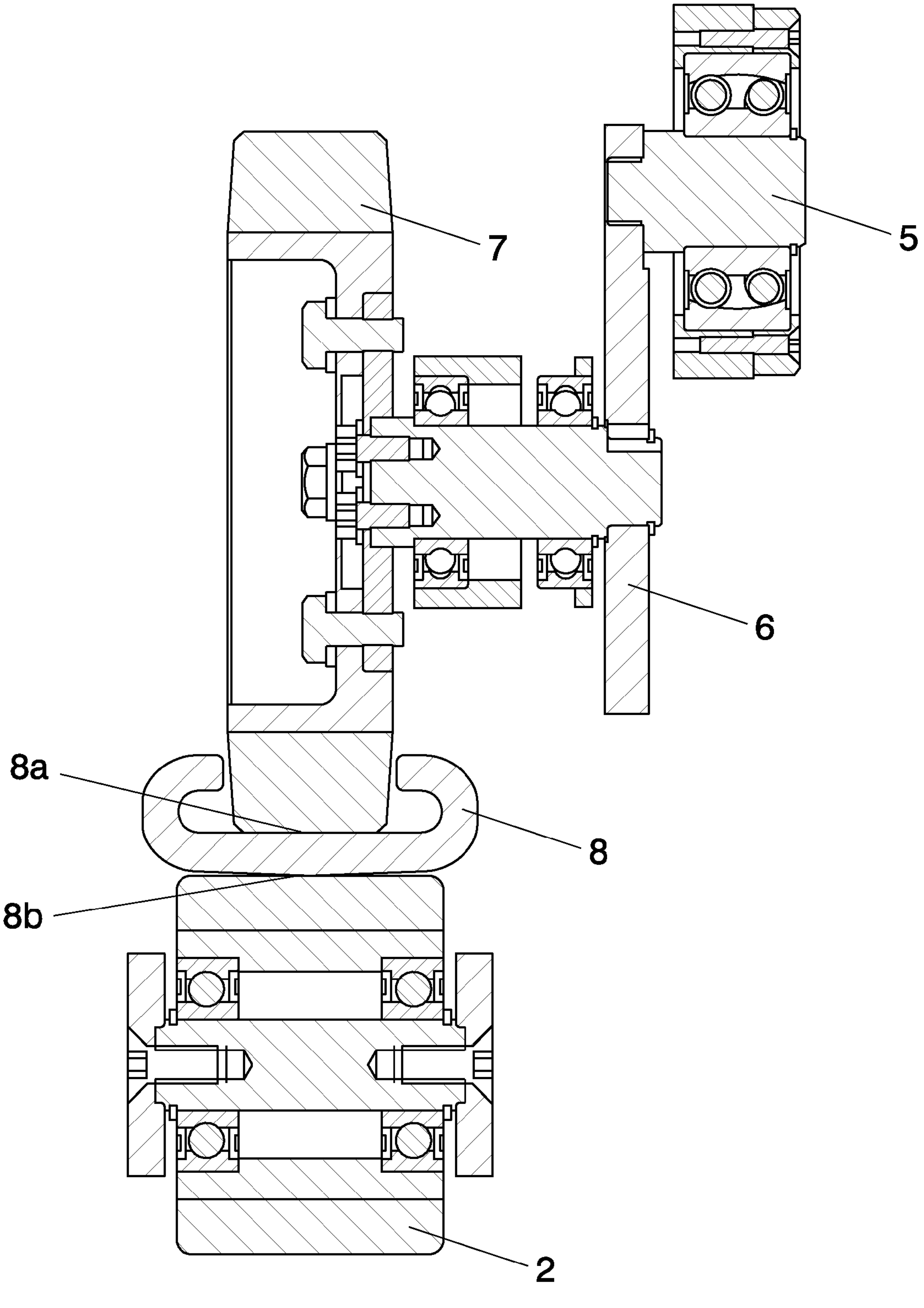
FIGS. 2 and 3 show, respective, cross-sectional views taken along lines A-A and B-B, indicated in FIG. 1.
Figure 3:
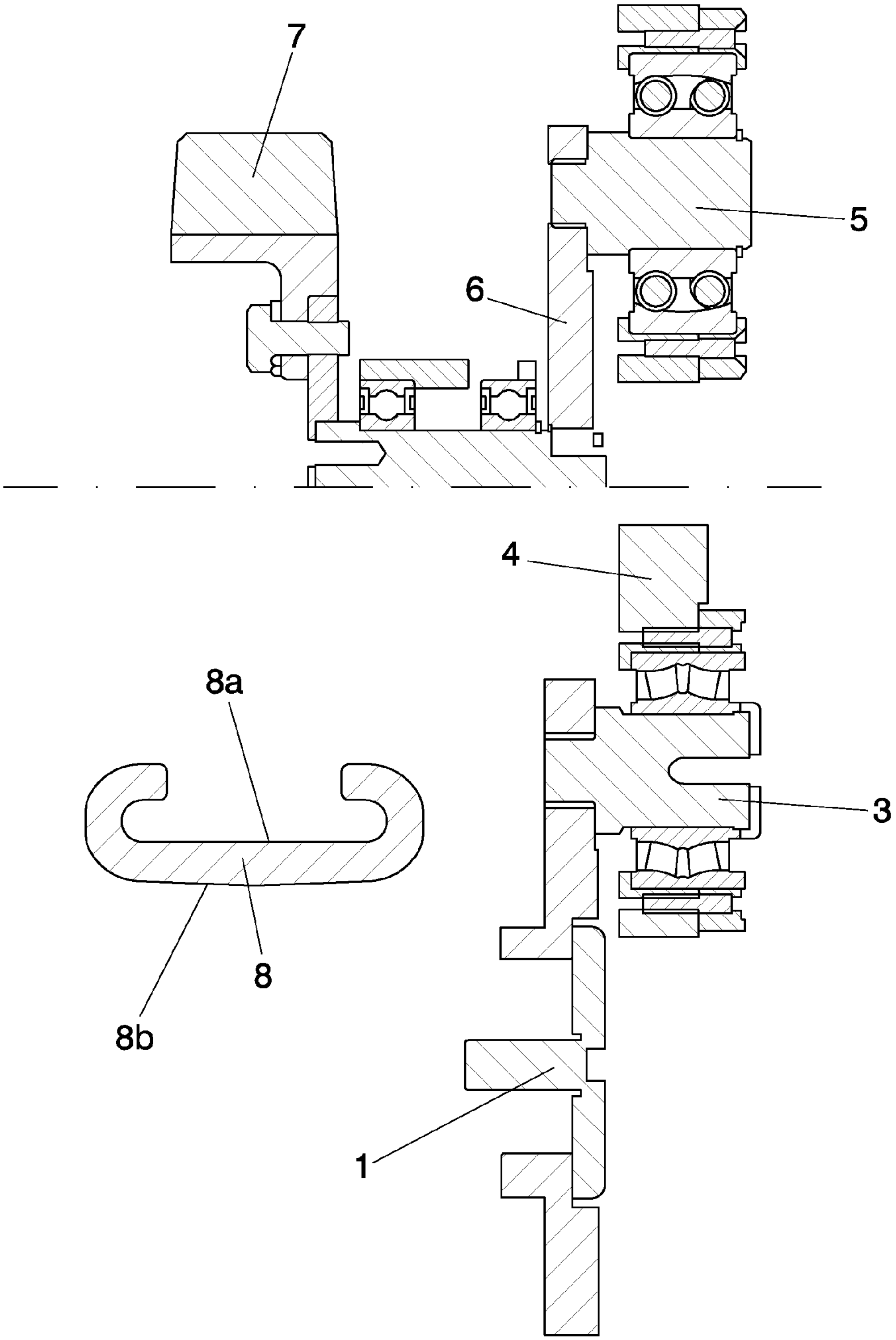

In view of the foregoing figures, and in accordance with the numbering system used, an example of preferred embodiment of the invention can be observed therein, which comprises the parts and elements indicated and described in detail below.

In this way, as can be seen in said figures, a preferred embodiment of the invention has been represented. The linear actuation of the handrail (8) is carried out by means of the traction rollers (7). To this end, the actuation entrance shaft (not represented) moves the crank (1) which, with the articulation of the shaft (3), actuates the main driving connection rod (4), transmitting the movement to the different traction rollers (7) by means of the shafts (5) actuated by the driven cranks (6). The traction rollers (7) act on the inner side (8*a*) of the handrail (8).

In turn, the pressure system is comprised of rollers (2) which come into contact by their opposite or outer side (8*b*) with the flexible band or handrail (8).

Figure 4:
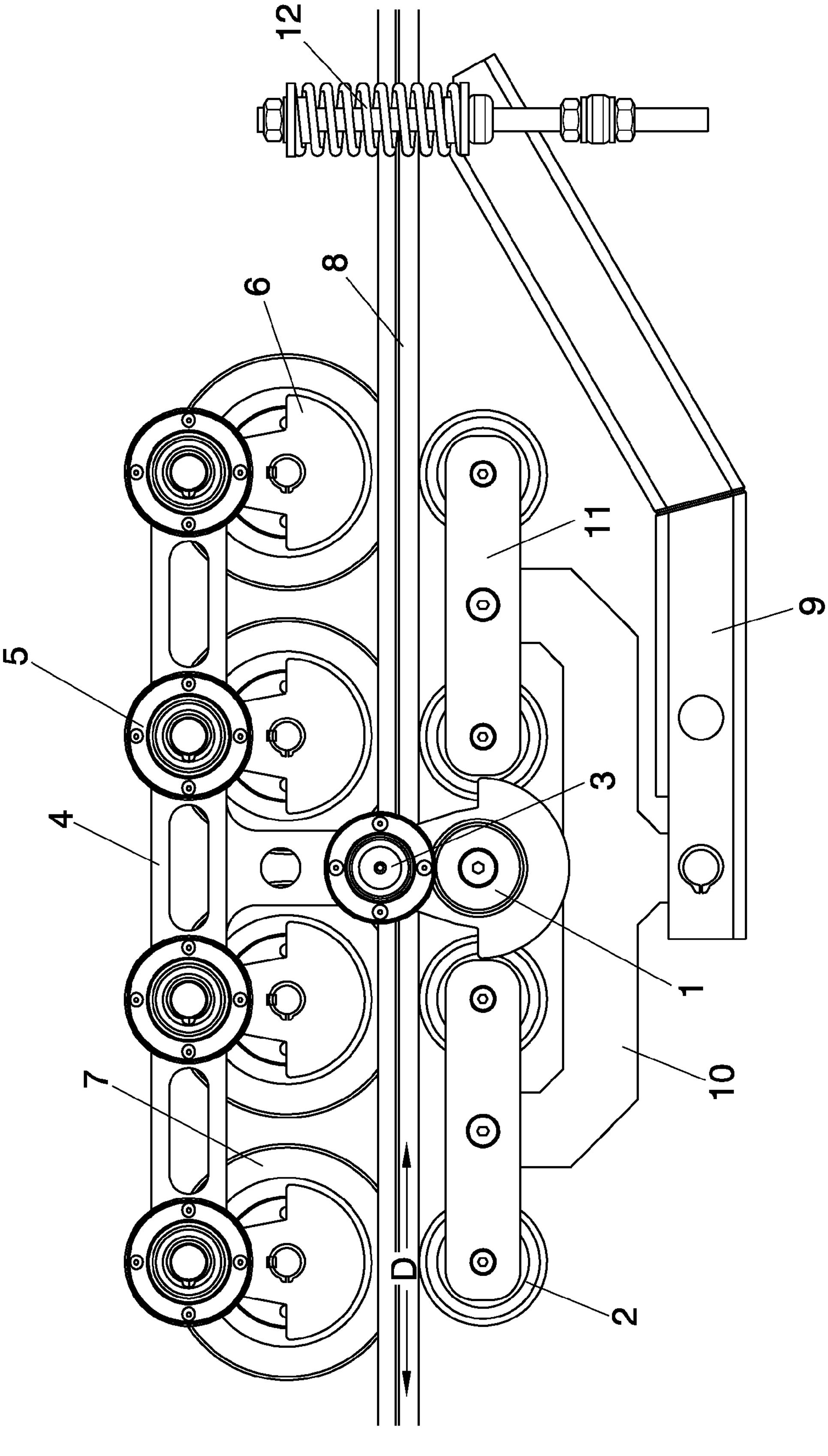
FIG. 4 shows a top plan view of the example of the invention represented in FIG. 1, incorporating the pressure application system.

FIG. 4 shows how the application of pressure against the worm band (8) and its balanced distribution over the different pressure rollers (7) is carried out by means of slides (11), whereto said rollers (2) are coupled. The slides (11) are actuated by a distributor (10) which is tightened by an elastic system (12) which transmits the tension by means of a beam (9).

It is worth noting that, alternatively, the pressure means exerted against the worm band or handrail (8) may consist of a belt applied to the outer surface (8*b*) of the flexible band or handrail (8). Additionally, in another variant of the alternative embodiment, said pressure means exerted against the worm band or handrail (8) may be comprised of a rubber block chain applied to the outer surface (8*b*) of said flexible band or handrail (8).

Therefore, the invention consists of a linearly actuated rotating handrail system for escalators and moving walkways, for the transport of persons or goods.

The present invention includes a worm band or handrail (8), flexible and displaceable in a displacement direction (D), with an outer side (8*b*) that allows a user's hand to lean upon it, and an inner side (8*a*) opposed to the outer side, which has primary friction means on at least one side (formed by the rollers (2) in the represented example).

There is a dragging means to transmit a dragging movement from the actuation means to the worm band (8), consisting of second friction means (the traction rollers (7) in the represented example) configured for coupling to the primary friction means (rollers (2)), in such a way that the worm band or handrail (8) is dragged by a friction force between the first friction means and the second friction means, dragging said band (8) in the direction of displacement (D) while avoiding a static friction coefficient between the first friction means and second friction means. Thereby, sliding between said first friction means and said second friction means is achieved.

There is also a movement transmission means, comprised of a system formed by cranks (crank (1)) and the driven cranks (6) in the represented example), a group of which are joined together (the driven cranks (6)) by a connection rod (4) which actuates them in a joint manner.

The system has the special characteristic that the aforementioned dragging means are comprised of a first layer of kinematic support, formed by the crank (1), the articulated shaft (3), the driving connection rod (4), the shafts (5) and the driven cranks (6), and a second layer of friction means formed by the traction rollers (7).

The pressure means of the worm band (8), comprised of the rollers (2) in the represented example, are disposed opposite to the traction rollers (7).

It is worth noting that the actuation may be reversible, thereby allowing the worm band or handrail (8) to move in either displacement direction (D).

Having sufficiently described the nature of the present invention, in addition to the manner in which to put it into practice, no further explanation appears necessary for any person skilled in the art to understand its scope and the advantages derived therefrom. Within its essentiality, the present invention may be put into practice in other forms of embodiment that differ in detail from that indicated by way of example, and which will also fall under the protection obtained provided that its fundamental principle is not altered, changed or modified.

The invention claimed is:

1. Linearly actuated rotating handrail system for escalators and moving walkways, the system comprising:

a flexible worm band or handrail being mobile along a displacement direction and having an outer side, an inner side opposed to said outer side, and a first friction means on at least one side;

dragging means to transmit a dragging movement from an actuation means up to the worm band, the dragging means being comprised of a second friction means and being coupled to the first friction means, the worm band being dragged by a friction force between the first friction means and the second friction means in the displacement direction and avoiding a static friction coefficient between the first friction means and the second friction means, achieving a sliding movement between the first friction means and the second friction means; and movement transmission means, being comprised of a plurality of cranks, being joined in groups by a connection rod, said connection rod actuating said cranks in a joint manner, wherein the dragging means comprises:

a first layer of kinematic support, formed by a crank, an articulated shaft, the connection rod, shafts and driven cranks, and a second layer of friction means formed by the traction rollers (7);

wherein an actuation entrance shaft moves the crank, the crank actuating, through the articulation shaft, said connection rod, the connection rod transmitting movement to the different traction rollers by the shafts, the shafts being actuated by the driven cranks;

wherein the traction rollers act on the inner side of the worm band;

wherein the worm band has a pressure means disposed opposite to the traction rollers, the pressure means being comprised of the rollers; and wherein the actuation may be reversible, thereby enabling the worm band to move in either displacement direction.

2. Linearly actuated rotating handrail system for escalators and moving walkways, according to claim 1, wherein the worm band has pressure applied thereto in balanced distribution over the different pressure rollers by slides actuated by a distributer, the distributer being tightened by an elastic system transmitting tension by a beam.

3. Linearly actuated rotating handrail system for escalators and moving walkways, according to claim 1, wherein the worm band has pressure applied thereto, said pressure being comprised of a belt applied to the outer surface of the flexible worm band.

4. Linearly actuated rotating handrail system for escalators and moving walkways, according to claim 1, wherein the worm band has pressure applied thereto, said pressure being comprised of a rubber block chain applied to the outer surface of the flexible worm band.

* * * * *